United States Patent [19]
Demko

[11] 3,873,687
[45] Mar. 25, 1975

[54] COSMETIC COLORING COMPOSITIONS
[75] Inventor: Ronald T. Demko, Chester, N.Y.
[73] Assignee: Avon Products, Inc., Suffern, N.Y.
[22] Filed: Sept. 21, 1973
[21] Appl. No.: 399,499

[52] U.S. Cl. .................. 424/64, 106/19, 106/21, 424/63
[51] Int. Cl. .................. A61k 7/02, C09d 13/00
[58] Field of Search ............ 424/63, 64; 106/19, 21

[56] References Cited
OTHER PUBLICATIONS
Bennett – The Cosmetic Formulary (1937), pages 86–88.

Primary Examiner—Sam Rosen
Attorney, Agent, or Firm—Pennie & Edmonds

[57] ABSTRACT

A cosmetic coloring composition comprising a homogeneous mixture of a compound capable of dyeing human skin in combination with a masking colorant material, all in a cosmetically acceptable base, said composition capable of having substantially the colorant color when in applicator form and substantially the dye color when applied to the human body surface.

8 Claims, No Drawings

COSMETIC COLORING COMPOSITIONS

BACKGROUND OF THE INVENTION

In our society, it is believed desirable to highlight various features of the human body. This is readily done by various skin colorants which highlight such features as the eyes, lips, and the like, so as to give the individual a distinctive and beautifying appearance. These various skin colorant materials are produced in various forms, such as liquids, rouges, creams, sticks, and powders and contain suitable colorant material for the particular application. In the case of lipsticks, for example, it is generally accepted that various fluorescein dyes form acceptable color material for highlighting the lips of the user. In various instances, multi-dyes have been used in the same lipstick composition to allow for the application of one or more than one lip color during the same application. These materials are formed by heterogeneously associating different colored masses in the form of a unitary product. The thus-formed product allows for the simple application of a plurality of separately colored bases.

Various cosmetic sticks have also been formed in which the base material is of a combination of waxes, fats, emollients, and oils which form the base product and into which a specific colorant is added. By combining various color materials, various shades of the cosmetic colorant are formed.

Cosmetic preparations which are photochromatic or phototropic in nature have also been heretofore known. These compositions have the property of reversibility of color according to their subjection to certain light rays. For example, rays in the visible or ultraviolet region of the spectrum of the sun may cause variation in the color of the cosmetic coating. The dye materials which are used in these compositions are compounds which have the property of entering into an activated state corresponding to a given coloration when irradiated with a certain light ray or with a certain amount of light rays. If the irradiation ceases, these materials lose or change their color. This type of cosmetic preparation may contain a colorant compound which can be cyclized to the various color forms by reexposure to the activiating rays. None of the prior colorants, however, is capable of changing color as soon as applied to the human body surface and without need for light irradiation.

SUMMARY OF THE INVENTION

A unique cosmetic coloring composition has been found which exhibits the color associated with a colorant material when said composition is in its applicator form, and when applied to the human body, the composition exhibits a different color.

The invention comprises a cosmetic composition comprising a skin dye material in combination with a colorant material capable of masking the color of the skin dye material while in the applicator form. The various color-forming materials are incorporated into a cosmetically acceptable base material which is suitable for the particular application desired.

DETAILED DESCRIPTION OF THE INVENTION

The present inventive composition may be utilized as a lip rouge, skin makeup, and the like.

The term "chameleon", as used herein, is intended to mean a composition capable of changing its color upon application to the human body. The cosmetic preparation has been found most useful as a skin colorant such as when used as a lip or face makeup material. The preparation according to this invention comprises commonly employed cosmetic constituents in a unique combination to form a chameleon cosmetic coloring composition.

While the composition herein described is useful for a variety of cosmetic colorant applications, such as lip rouge, lipstick, skin rouge and face makeup in such forms as loose and pressed powders, and the like and have been found useful particularly as a lip colorant pomade composition and will be discussed in connection therewith. It will be evident to those skilled in this art that for the other coloring uses indicated, the usual components can be used in addition to the dye and makeup colorant of the present invention.

The skin dye material may comprise any of the usual organic dye materials which are known to stain and color the skin. Such dyes may be used singly or in combination to give the desired dye colorant upon application to the skin of the user. It has been found that such dyes are preferably of the family of fluorescein or halogenated fluorescein materials. The materials preferred are those that comply with the regulations of the Food and Drug Administration for use in lipsticks and include such materials as fluorescein, tetrabromo-fluorescein (D and C Red 21), tetrabromo-tetrachloro-fluorescein (D and C Red 27), dibromo-fluorescein (D and C Orange 5), diiodo-fluorescein (D and C Orange 10) tribromo-fluorescein, tetraiodo-fluorescein (D and C Red 3), tribromo-fluorescein, and the like as well as mixtures thereof which give the desired color upon application to the skin of the user.

Various fluorescein derivatives have also been found useful as the skin colorant and, in particular, as a lipstick colorant material. These include reaction products of fatty acids or salts of fatty acids with the fluorescein or halogenated fluorescein materials, such as the reaction product of tetrabromo-fluorescein and stearic acid and the like.

Other usual organic dye materials which are known to stain and color the skin may be used. These dyes include D & C Blue 4 (CI 42090), D & C Blue 6 (CI 73000), D & C Orange No. 4 (CI 15510), D & C Orange No. 11 (CI 45425), D & C Red No. 6 (CI 15850), D & C Red No. 10 (CI 15630) and the like.

The skin dye material is used as a preponderant component of the coloring agents of this composition. It has been found that such skin dye material should be used in concentrations ranging from about 0.001 to about 6 percent by weight of the total cosmetic composition. Preferred concentrations ranging from about 0.05 to about 2 percent of the total coloring agents.

The coloring material which has been found useful in forming the chameleon lipstick composition of this invention may be any colorant material having a masking property which is capable of masking the color of the skin dye material which the composition is in applicator form, but which does not mask the staining colorant dye when such composition is applied to the human skin for cosmetic purposes. Lake colorants have been found to be most effective as a masking colorant material useful in this invention. Such colorant materials are also approved by the Food and Drug Administration for use in lipstick compositions. These colorants are the metallic complexes of organic coloring matter obtained by precipitating an organic dyestuff on an inorganic substrate. These lake colorants include complexes of acid dyes with alkaline earth or heavy metal salts and complexes of basic dyes of di and triphenylmethane, xanthene and the like precipitated with tannintartar, emetic, or fatty acids or phosphotungstic, phosphomolybdic, or phosphomolybdotungstic acids. Examples of suitable lake colorants include the calcium and barium salts of acid dyes such as Helio Orange CAG (analine and Schaeffer acid), Helio Orange TD (o-chloroanaline and Schaeffer acid), Permanent Orange R (CI 156) (5-chloroanaline-2-sulfonic acid and B-naphthol), Lake Red C (CI 165) (6-chloro-m-toluidine-4-sulfonic acid and B-naphtol), Lithol Rubine 3B (2-naphthol amine-8-sulfonic acid and hydroxynaphthoic acid), Mini Red (D & C Red No. 7 Lake), H.K. Formula No. K (D & C Red No. 11 Lake).

Lake colors of basic dyes of good brilliance can be obtained with phosphotungstic and phosphomolybdic acid lakes and brilliant colors are obtained with phosphomolybdenumtungstate. These are obtained with phenylmethane dyes such as Victoria Pure Blue BO (Lake Fanal color IG: Blue B) Auramine G (Fanal IG: Yellow G) Rhodamine 3B Extra (Fanal IG: Red 6B) and Methyl Violet N Blue (Fanal IG: Violet R Supra).

Inorganic colorants capable of masking the dye color while the composition is in applicator form but which does not mask the staining colorant dye when the composition is applied to human skin are the various heavy metal oxides and hydrates such as various iron oxides (CI 77491, CI 77492 and CI 77499) chromium sesquioxide hydrate (CI 77289) and the like.

It has been found that only a small amount of such colorant material need be used to mask the color of the skin dye material. The colorant material may range from about 0.001 to about 6 percent of the total amount of coloring agents with from about 0.01 to about 1 percent of the total amount of coloring agents being preferred.

Although the exact nature of the process by which the chameleon property of the cosmetic composition herein disclosed is attained is not completely understood, it is believed to occur due to the ability of the skin colorant to interact with skin and thereby attain the dominant color thereon.

In addition to the essential components disccused above, the pomade requires a cosmetically acceptable base formulation. Suitable are any known to the art such as wax bases which contain materials such as carnuba wax, candelilla wax, ozokerite, beeswax, lanolin, ceresin, spermaciti, isopropyl myristate, castor oil, cocoa butter, cetyl alcohol, stearic acid and of the other usual lip pomade base materials which when combined produce a suitable base formulation having the suitable consistency for use as a colorant cosmetic material. The exact combination of materials being easily formulated by those skilled in the art. An example of a suitable lipstick pomade base composition usefully employed is as follows:

| Composition | Weight Percent |
| --- | --- |
| Castor Oil (Chemical Abstract Service ID No. MX 8001-79-4) | 65 |
| Candelilla Wax (Chemical Abstract Service I.D. No. MX 8006-44-8) | 7 |
| Lanolin Oil | 10 |
| Carnuba Wax (CAS I.D. No. MX 8015-86-9) | 3 |
| Ozokerite (CAS I.D. NO. MX 8001-75-0) | 3 |
| Beeswax | 7 |
| Isopropyl myristate | 5 |

Other suitable cosmetic base formulations which may act as a carrier for the colorants may be vanishing cream bases illustrated by

| Components | Weight Percent |
| --- | --- |
| Stearic Acid | 25 |
| Spermaciti | 5 |
| Aminomethyl propanediol | 1 |
| Glycerin | 8 |
| Water | 61 |

Other common cosmetic base formulations known to those skilled in the art can be used according to the particular type of application.

The cosmetic coloring composition of this invention may also have incorporated therein various additional ingredients, such as emulsifiers, dispersants, fillers, thickeners, perfumes, and the like to produce a cosmetically acceptable product having the desirable physical properties. These components are added in their usual proportions for their usual effect.

The coloring agents used in this invention to provide proper coloring to the base material while in the applicator form and to provide a different color to the skin when in the cosmetic form are illustrated by the dyes and colorants listed hereinabove which may be used in combination in amounts of from about 0.002 to about 12 parts by weight for each 100 parts by weight of lipstick base. Flavoring agents, such as synthetic aromatics, essential oils, or other similar materials may also be included if desired.

The additional materials hereinabove described are not necessary to or essential parts of the present composition but may be used as desired.

The following examples herein disclosed are for illustrative purposes only and are not meant to be limiting upon the inventive concept except as set forth in the appended claims. All parts and percentages are by weight unless otherwise indicated.

EXAMPLE I

A mixture of coloring agents consisting of 1.0 parts tetrabromofluorescein in combination with 0.1 parts of dibromofluorescein (B and C Orange 5) and 0.2 parts of the colorants FD and C Blue No. 1 Lake (the aluminum salt of certified FD & C Blue No. 1 extended on aluminum substrate, CAS I.D. 2650-18-2) is mixed in a conventional manner with a wax base comprising 5 parts cetyl alcohol, 27.7 parts beeswax, 66 parts castor oil, and 22 parts of the combined coloring agents. The mixture is formed into a lipstick pomade. The lipstick has a blue coloration but when applied to the lips gives the lips a red coloration.

EXAMPLE 2

A skin rouge composition containing 0.5 parts of dibromo-fluorescein and 5 parts tribromo-fluorescein is combined with 1.5 parts of FD and C Blue No. 1 Lake colorant material. The combined coloring agents are mixed with 93 parts of a base having a composition as follows: ceresin wax, melting point 67°C., 31 percent; hydrogenated cotton seed oil, 6 percent; castor oil, U.S.P. 51 percent; carnuba wax, 4 percent; mineral oil, 7 percent; butylated hydroxy anisole, 0.1 percent; Carbosil (finely divided silicon dioxide) 0.9 percent. The material was formed into a skin cream base which had a blue coloration in its applicator form but, when applied to the human skin, formed an orange tone thereon.

EXAMPLE 3

A mixture of coloring agents consisting of 0.1 part tetrabromofluorescein (D and C Red 21) and 0.5 parts tetrabromo-chloro-fluorescein (D and C Red 27) and 0.1 part of the calcium lake of 5-chloro-analine-2-sulfonic acid and naphtol (Permanent Orange R, CI No. 156) is mixed in a conventional manner with 99.3 parts of a wax base comprising 5 parts cetyl alcohol, 9 parts beeswax, 66 parts castor oil and 20 of the combined coloring agents. The mixture is formed into a lipstick pomade which has an orange coloration but when applied to the skin gives a red-blue coloration.

EXAMPLE 4

A mixture of coloring agents consisting of 0.5 part tetrabromofluorescein (D and C Red 21), 0.1 part tetrabromofluorescein stearate and 0.1 part of triphenyl methanephosphomolybdenumtungstate are mixed with a wax base in the same manner as Example 3. The resultant lip pomade is a brilliant blue and when applied to the lips give the same a red coloration.

EXAMPLE 5

A mixture of coloring agents consisting of 0.5 parts tetrabromofluorescein (D and C Red 21), 0.1 parts tetrabromofluorescein stearates and 0.3 part chromium sesquioxide hydrate are mixed with a wax base in the same manner as in Example 3. The resultant pomade is a green and when applied to the lips give the same a red coloration.

While the invention has been described in connection with a preferred embodiment, it is not intended to limit the invention to the particular form set forth, but, on the contrary, it is intended to cover such alternatives, modifications, and equivalents as may be included within the spirit and scope of the invention as defined by the appended claims.

What is claimed is:

1. A cosmetic coloring composition comprising a homogeneous mixture of coloring agents comprising of from about 0.001 to about 6 percent of at least one skin dye material capable of staining and coloring the skin of the user, from about 0.001 to about 6 percent of a colorant material exhibiting a different color than that exhibited by the dye material and which is capable of masking the color of said dye material while in applicator form in combination with a cosmetically acceptable base, said composition having substantially the colorant color in applicator form and substantially the dye color when applied to the skin of the user.

2. The cosmetic coloring composition of claim 1 wherein the dye material is selected from fluorescein or halogenated fluorescein dye materials and the colorant is a lake colorant material capable of masking the color of the dye material while in applicator form and does not mask the dye color when composition is applied to the body.

3. The cosmetic coloring composition of claim 1 wherein the dye material is selected from fluorescein or halogenated fluorescein dye materials and the colorant is a metal oxide or hydrate capable of masking the color of the dye material while in applicator form and does not mask the dye color when composition is applied to the body.

4. The composition of claim 1 wherein the cosmetically acceptable base is a wax base.

5. The composition of claim 1 wherein the composition is a lip pomade in stick form.

6. The composition of claim 1 wherein the composition is a skin colorant composition.

7. The composition of claim 2 wherein the composition is a lip pomade in stick form.

8. The composition of claim 3 wherein the composition is a lip pomade in stick form.

* * * * *